(12) United States Patent
Kim et al.

(10) Patent No.: US 11,046,148 B2
(45) Date of Patent: Jun. 29, 2021

(54) AIR CONDITIONER FOR VEHICLES

(71) Applicant: Hanon Systems, Daejeon (KR)

(72) Inventors: Hyeon Gyu Kim, Daejeon (KR); Doo Hoon Kim, Daejeon (KR); Chul Hee Kim, Daejeon (KR); Kyung Ju An, Daejeon (KR); Joong Man Han, Daejeon (KR)

(73) Assignee: Hanon Systems, Daejeon (KR)

( * ) Notice: Subject to any disclaimer, the term of this patent is extended or adjusted under 35 U.S.C. 154(b) by 122 days.

(21) Appl. No.: 15/963,473

(22) Filed: Apr. 26, 2018

(65) Prior Publication Data

US 2018/0312036 A1    Nov. 1, 2018

(30) Foreign Application Priority Data

Apr. 26, 2017 (KR) .......................... 10-2017-0053388
Apr. 11, 2018 (KR) .......................... 10-2018-0041937

(51) Int. Cl.
*B60H 1/00* (2006.01)
*B60H 1/03* (2006.01)

(52) U.S. Cl.
CPC ..... *B60H 1/00921* (2013.01); *B60H 1/00278* (2013.01); *B60H 1/034* (2013.01); *B60H 2001/00307* (2013.01); *B60H 2001/00928* (2013.01); *B60H 2001/00949* (2013.01)

(58) Field of Classification Search
CPC .................. B60H 1/00278; B60H 1/00921
See application file for complete search history.

(56) References Cited

U.S. PATENT DOCUMENTS

2013/0026244 A1* 1/2013 Chernyavsky ..... B60H 1/00314
                                                                237/12
2015/0115048 A1* 4/2015 Brodie .............. B60H 1/00764
                                                                237/2 B

* cited by examiner

*Primary Examiner* — Elizabeth J Martin
*Assistant Examiner* — Nael N Babaa
(74) *Attorney, Agent, or Firm* — Norton Rose Fulbright US LLP; James R. Crawford

(57) ABSTRACT

The present invention relates to an air conditioner for a vehicle with a heat pump system structure, which has a simple piping structure and enhances heating performance, thereby reducing a package, and making common use with an air conditioner for an internal combustion engine possible.

13 Claims, 9 Drawing Sheets

PRIOR ART

AIR CONDITIONER FOR VEHICLES

CROSS REFERENCE TO RELATED APPLICATIONS

This application claims priority from Korean Patent Application Nos. 10-2017-0053388 filed Apr. 26, 2017 and 10-2018-0041937 filed Apr. 11, 2018, which are hereby incorporated by reference in their entireties.

BACKGROUND OF THE INVENTION

Field of the Invention

The present invention relates to an air conditioner for a vehicle, and more particularly, to an air conditioner for a vehicle with a heat pump system structure, which can change a flow direction of refrigerant using one refrigerant cycle so as to selectively carry out cooling and heating.

Background Art

In general, an air conditioner for a vehicle includes a cooling system for cooling the interior of the vehicle and a heating system for heating the interior of the vehicle. The cooling system exchanges heat between air passing the outside of an evaporator of a refrigerant cycle and refrigerant flowing inside the evaporator and converts the air into cold air so as to cool the interior of the vehicle. Moreover, the heating system exchanges heat between air passing the outside of a heater core of a cooling water cycle and cooling water flowing inside the heater core and converts the air into warm air so as to heat the interior of the vehicle.

In the meantime, differently from the above-mentioned air conditioner for a vehicle, there is a heat pump system which changes a flow direction of refrigerant using one refrigerant cycle in order to selectively carry out cooling and heating. Such a heat pump system includes: an internal heat exchanger mounted inside an air-conditioning case to exchange heat with air blown to the interior of the vehicle; an external heat exchanger for exchanging heat outside the air-conditioning case; and a direction regulating valve for changing a flow direction of the refrigerant. Therefore, in case that a cooling mode is in operation according to the flow direction of the refrigerant by the direction regulating valve, the internal heat exchanger serves as a heat exchanger for cooling, and in case that a heating mode is in operation, the internal heat exchanger serves as a heat exchanger for heating.

FIG. 1 is a view showing a conventional heat pump system for a vehicle. As shown in FIG. 1, the conventional heat pump system for the vehicle includes a compressor 30, a high pressure heat exchanger 32, a first expansion valve 34, a first bypass valve 36, an external heat exchanger 48, a low pressure heat exchanger 60, an accumulator 62, a second expansion valve 56, and a second bypass valve 58.

The compressor 30 compresses and discharges refrigerant, and the low pressure heat exchanger 32 radiates heat of the refrigerant discharged from the compressor 30. The first expansion valve 34 and the first bypass valve 36 are mounted in a parallel structure to selectively pass the refrigerant passing through the high pressure heat exchanger 32, and the external heat exchanger 48 heat-exchanges the refrigerant, which passed the first expansion valve 34 or the first bypass valve 36, outdoors. Moreover, the low pressure heat exchanger 60 evaporates the refrigerant passing the external heat exchanger 48, and the accumulator 62 divides the refrigerant passing the low pressure heat exchanger 60 into gas-phase refrigerant and liquid-phase refrigerant.

The second expansion valve 56 selectively expands the refrigerant supplied to the low pressure heat exchanger 60, and the second bypass valve 58 is mounted in parallel with the second expansion valve 56 to selectively connect an outlet of the external heat exchanger 48 and an inlet of the accumulator 62. The high pressure heat exchanger 32 and the low pressure heat exchanger 60 are embedded in an air-conditioning case 10, and the air-conditioning case 10 has a temp door 12 for regulating a mixed amount of cold air and warm air, and a blower 20 mounted at an inlet of the air-conditioning case 10.

Furthermore, the air-conditioning case 10 further includes a PTC heater 70 of an electric heater, which is a heat source for assisting heating performance of the high pressure heat exchanger 32. The PTC heater 70 is generally configured with high voltage PTC in order to solve the problem that the conventional heat pump system cannot provide sufficient heating efficiency by the high pressure heat exchanger 32 alone.

The conventional air conditioner for the vehicle has a disadvantage in that its size increases in the back-and-forth direction of the vehicle ("T" direction in FIG. 1) because the high pressure heat exchanger 62, which is an internal condenser, and the high voltage PTC heater 70 are mounted inside the air-conditioning case 10. If the high voltage PTC heater is used, the thickness in the "T" direction becomes increased more, so improvement of heating performance and reduction of the size cannot be achieved at the same time.

Additionally, the conventional air conditioner for the vehicle cannot be in common use with an air conditioner for an internal combustion engine because the high pressure heat exchanger 62, which is an internal condenser, and the high voltage PTC heater 70 are used, and it increases the unit cost of production.

In addition, the conventional air conditioner for the vehicle has another disadvantage in that the entire piping arrangement becomes complicated because it requires a defrosting line and a dehumidification line for a defrosting mode and a dehumidification mode.

SUMMARY OF THE INVENTION

Accordingly, the present invention has been made to solve the above-mentioned problems occurring in the prior arts, and it is an object of the present invention to provide an air conditioner for a vehicle with a heat pump system structure, which hats a simple piping structure and enhances heating performance, thereby reducing a package, and making common use with an air conditioner for an internal combustion engine possible.

To accomplish the above object, according to the present invention, there is provided an air conditioner for a vehicle having a refrigerant circulation system, which circulates refrigerant and exchanges heat between the refrigerant and inside air of an air-conditioning case in order to cool or heat the interior of the vehicle, the air conditioner comprising: a first heat exchanger for exchanging heat with refrigerant of the refrigerant circulation system, the first heat exchanger raising temperature of coolant so as to use the coolant as a heating source for the interior of the vehicle; a second heat exchanger, which is disposed inside the air-conditioning case to heat air passing through the second heat exchanger, and in which coolant flows; a first coolant pipe, which connects the first heat exchanger and the second heat exchanger with each other and is a passage through which the coolant circulates; a second coolant pipe, which branches off from the first coolant pipe and exchanges heat with an engine; and a first valve system, which makes the coolant flowing in the first coolant pipe selectively flow to the second coolant pipe.

Moreover, the first heat exchanger is a water cooled condenser.

Furthermore, the second heat exchanger is a heater core.

Additionally, the first valve system circulates the coolant through the engine in a defrosting mode or a dehumidification mode.

The air conditioner for the vehicle further includes: a sensor for sensing outdoor temperature; and a control unit for comparing the sensed outdoor temperature with reference temperature, wherein the control unit circulates the coolant to the engine if the outdoor temperature is lower than the reference temperature, and makes the coolant bypass the engine if the outdoor temperature is higher than the reference temperature.

Moreover, the refrigerant circulation system includes: a first refrigerant pipe on which a compressor, a condenser, a first expansion means and an evaporator are mounted in order; a second refrigerant pipe branching off from the first refrigerant pipe and bypassing the evaporator; and a second valve system for controlling a flow of the refrigerant so that the refrigerant passes or bypasses the evaporator.

Furthermore, the first heat exchanger comprises a second expansion means, which is disposed between the compressor and the condenser to selectively throttle the refrigerant between the first heat exchanger and the condenser.

The air conditioner for the vehicle further includes a low voltage PTC heater electrically heated inside the air-conditioning case.

The air conditioner for the vehicle further includes: a third refrigerant pipe branching off from the first refrigerant pipe at a downstream side of a branching point of the second refrigerant pipe in a refrigerant flow direction and bypassing the evaporator; a third coolant pipe exchanging heat with a battery of the vehicle; and a third expansion means and a chiller disposed on the third refrigerant pipe in order, wherein the chiller exchanges heat between coolant of the third coolant pipe and refrigerant of the third refrigerant pipe.

The first valve system is configured such that the coolant circulating the second heat exchanger selectively passes the first heat exchanger and the engine.

According to the present invention, the air conditioner for a vehicle can reduce manufacturing costs because it can reduce a package and make common use with an air conditioner for an internal combustion engine possible by having the simple piping structure and enhancing heating performance. Moreover, the air conditioner for a vehicle can reduce total weight, volume and expense because it does not require a defrosting line (pipe) and a dehumidification line (pipe) and can reduce the number of valves. Additionally, the air conditioner for the vehicle can reduce risk factors in safety of passengers caused by high voltage parts because it does not require an internal high voltage PTC heater.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, reference will be now made in detail to exemplary embodiments of the present invention with reference to the attached drawings.

Figure 1:
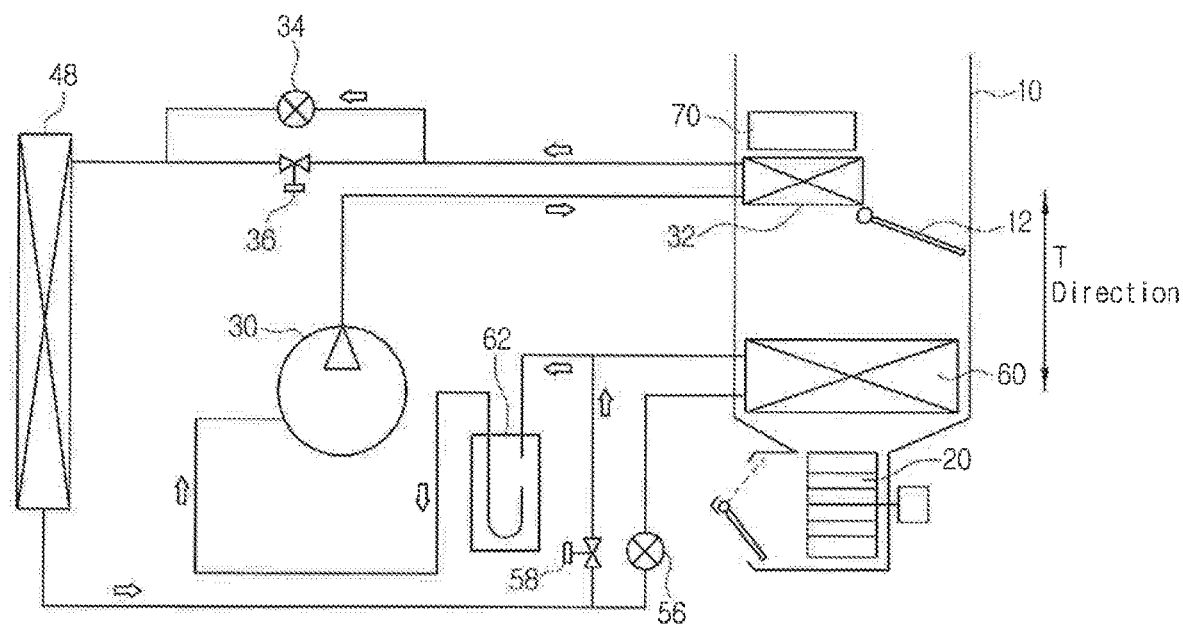
FIG. 1 is a view showing a conventional heat pump system for a vehicle.
Figure 2:
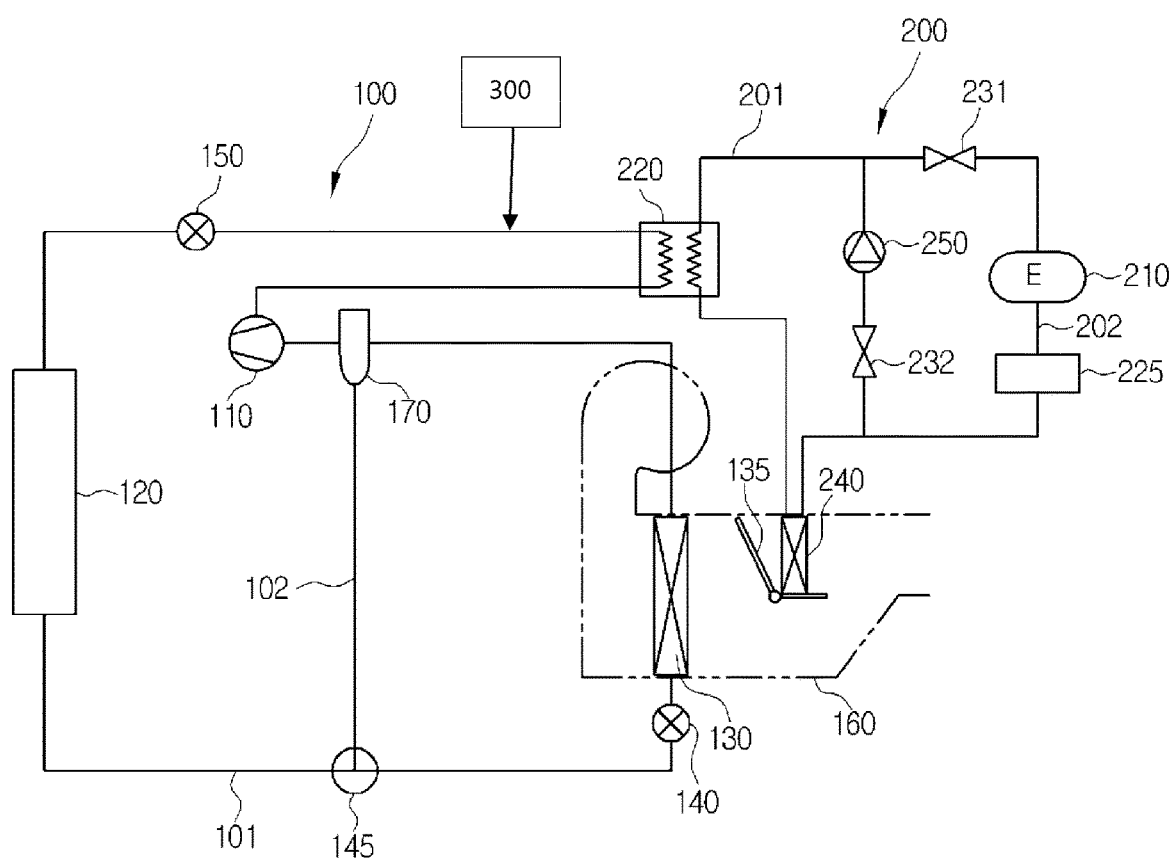
FIG. 2 is a view showing an air conditioner for a vehicle according to a first preferred embodiment of the present invention.

FIG. 2 is a view showing an air conditioner for a vehicle according to a first preferred embodiment of the present invention.

As shown in FIG. 2, the air conditioner for the vehicle according to the first preferred embodiment of the present invention includes a refrigerant circulation system 100 and a coolant loop 200. The refrigerant circulation system 100 circulates refrigerant and exchanges heat with air inside an air-conditioning case 160 in order to cool or heat the interior of the vehicle.

The coolant loop 200 includes a first heat exchanger, a second heat exchanger, a first coolant pipe 201, a second coolant pipe 202, and a first valve system.

The first heat exchanger exchanges heat with refrigerant of the refrigerant circulation system 100. The air conditioner for the vehicle raises temperature of coolant through the first heat exchanger to be used as a heat source for heating the interior of the vehicle. The second heat exchanger is disposed inside the air-conditioning case 160. Coolant flows also inside the second heat exchanger, and the second heat exchanger heats air, which passes through the second heat exchanger.

The first coolant pipe 201 connects the first heat exchanger with the second heat exchanger and serves as a passage through which coolant circulates. A circulation pump 250 for circulating the coolant is disposed inside the first coolant pipe 201.

The second coolant pipe 202 branches off from the first coolant pipe 201 and exchanges heat with an engine 210. A reservoir tank 225 may be mounted on the second coolant pipe 202.

The first heat exchanger is a water cooled condenser 220, and the second heat exchanger is a heater core 240. In this instance, the heater core 240 is a heat exchanger that uses warm cooling water, which exchanges heat with an engine in an air conditioner for an internal combustion engine, as a heating source, so that the air conditioner according to the first preferred embodiment of the present invention can be used commonly as an air conditioner for an electric vehicle and an air conditioner for an internal combustion engine.

The first valve system makes the coolant of the first coolant pipe 201 selectively flow through the second coolant pipe 202. The first valve system includes a first two-way valve 231 and a second two-way valve 232. The first two-way valve 231 is arranged at a downstream side of the engine 210 in a flow direction of the coolant, and the second two-way valve 232 is arranged at an upstream side of the engine 210.

When the first two-way valve 231 closes a flow path and the second two-way valve opens a flow path, the coolant circulates the heater core 240 and the water cooled condenser 220 in order. Moreover, when the first two-way valve 231 opens the flow path and the second two-way valve 232 closes the flow path, the coolant circulates the heater core 240, the reservoir tank 225, the engine 210 and the water cooled condenser 220 in order.

The refrigerant circulation system 100 includes a first refrigerant pipe 101, a second refrigerant pipe 102, and a second valve system.

The first refrigerant pipe 101 is configured by a compressor 110, a condenser 120, a first expansion means 140 and an evaporator 130 formed in order.

The compressor 110 is an electro compressor driven by electrical energy. The compressor 110 inhales and compresses gas-phase refrigerant of low-temperature and low-pressure passing through the evaporator 130, and then, discharges the refrigerant in a gas phase of high-temperature and high-pressure toward the condenser 120. An accumulator 170 for dividing the refrigerant into liquid-phase refrigerant and gas-phase refrigerant and supplying only the gas-phase refrigerant is disposed at an upstream side of the compressor 110 in a refrigerant flow direction.

The condenser 120 is disposed at the front side of the vehicle and is an air-cooled condenser which exchanges heat with vehicle-induced wind to condense the refrigerant. That is, the condenser 120 exchanges heat between outdoor air and the gas-phase refrigerant of high-temperature and high-pressure discharged from the compressor 110 to condense the refrigerant. A blowing means is disposed near to the condenser 120.

The first expansion means 140 rapidly expands the liquid-phase refrigerant discharged from the condenser 120 by a throttling action, and sends the refrigerant in a wet-saturated state of low-temperature and low-pressure to the evaporator 130. The first expansion means 140 may be an expansion valve, such as EXV, TXV, or the like, or an orifice.

The evaporator 130 is disposed inside the air-conditioning case 160. The evaporator 130 is arranged at the upstream side of the heater core 240 in the air flow direction. The evaporator 130 exchanges neat between the refrigerant of low-pressure discharged from the first expansion means 140 and the inside air of the air-conditioning case 160 to evaporate the refrigerant, so that air is cooled due to a heat absorption by an evaporative latent heat of the refrigerant.

A blower is disposed inside the air-conditioning case 160 to form an airflow near an air inlet. Furthermore, a temp door 135 is disposed between the evaporator 130 and the heater core 240 to regulate temperature of air-conditioning wind discharged to the interior of the vehicle by adjusting an amount of the air passing through the heater core 240 and an amount of the air bypassing the heater core 240.

The second refrigerant pipe 102 branches off from the first refrigerant pipe 101 and bypasses the evaporator 130. The second refrigerant pipe 102 branches off between the condenser 120 and the first expansion means 140 and meets between the accumulator 170 and the evaporator 130.

The second valve system controls a flow of the refrigerant such that the refrigerant passes or bypasses the evaporator 130. The second valve system is a three-way valve 145. The three-way valve 145 is disposed at a branching point of the first refrigerant pipe 101 and the second refrigerant pipe 102 to control a flow of the refrigerant so that the refrigerant passing the condenser 120 flows through the evaporator 130 or bypasses the evaporator 130.

Additionally, the water cooled condenser 220 is disposed between the compressor 110 and the condenser 120. Moreover, a second expansion means 150 is disposed between the water cooled condenser 220 and the compressor 120. The second expansion means 150 is to selectively throttle refrigerant passing through the second expansion means 150, and may be an orifice-integrated two-way valve.

That is, the compressor 110, the water cooled condenser 220, the second expansion means 150, the condenser 120, the first expansion means 140, and the evaporator 130 are arranged on the first refrigerant pipe 101 in order.

The air conditioner for the vehicle according to the first preferred embodiment of the present invention includes a control unit. The control unit performs various air-conditioning modes by regulating the flow of the refrigerant, the flow of the coolant, and working of doors.

The control unit controls the first valve system such that the coolant circulates the engine 210 in a defrosting mode or a dehumidification mode. Through the above configuration, the air conditioner can defrost and dehumidify using waste heat of the engine 210.

The air conditioner for the vehicle according to the embodiment of the present invention has a sensor for sensing outdoor temperature. The control unit compares the sensed outdoor temperature with reference temperature. If the outdoor temperature is lower than the reference temperature, the control unit circulates coolant to the engine. Additionally, if the outdoor temperature is higher than the reference temperature, the control unit makes the coolant bypass the engine.

For instance, if outdoor temperature is lower than −20° C., the control unit judges that the condenser 120, which is the external heat exchanger, is frosted, and circulates the coolant to exchange heat with the engine 210 so as to heat the interior of the vehicle using the waste heat of the engine 210 as a heating source. In addition, if outdoor temperature is higher than −20° C., the control unit makes the coolant bypass the engine 210 and operates the refrigerant circulation system 100 so as to operate the heat pump heating system using the water cooled condenser 220 as a heating source.

Figure 3:
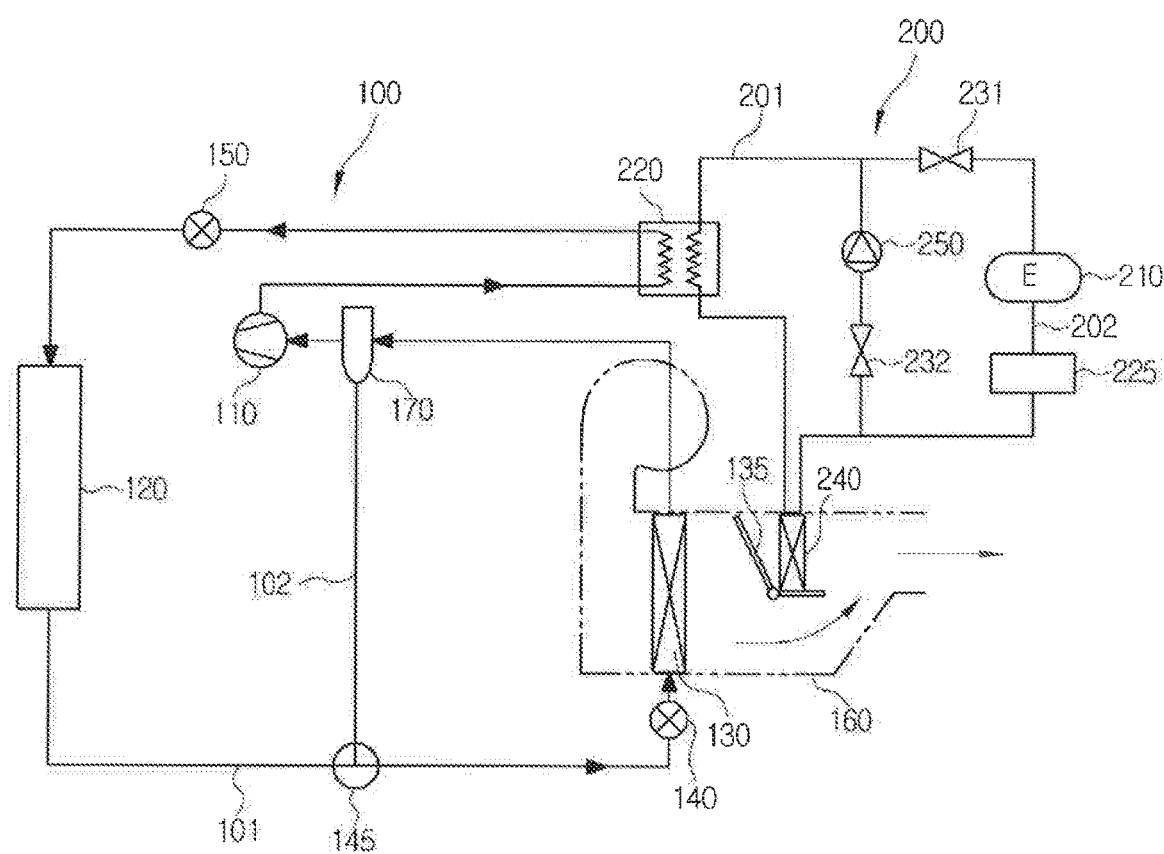
FIG. 3 is a view showing a cooling mode of the air conditioner for the vehicle according to the first preferred embodiment of the present invention.

FIG. 3 is a view showing a cooling mode of the air conditioner for the vehicle according to the first preferred embodiment of the present invention.

Referring to FIG. 3, in the cooling mode, refrigerant circulates the compressor 110, the water cooled condenser 220, the second expansion means 150, the condenser 120, the first expansion means 140, the evaporator 130, and the accumulator 170 in order. In this instance, operation of the coolant loop 200 is stopped, the refrigerant does not exchange heat in the water cooled condenser 220 but is condensed in the condenser 120 by directly passing the second expansion means 150 without any throttling action, is evaporated in the evaporator 130 after being throttled in the first expansion means 140, and then, returns to the compressor 110.

The temp door 135 inside the air-conditioning case 160 operates to close the flow path directing the heater core 240, so that the air cooled after exchanging heat with the evaporator 130 cools the interior of the vehicle.

Figure 4:
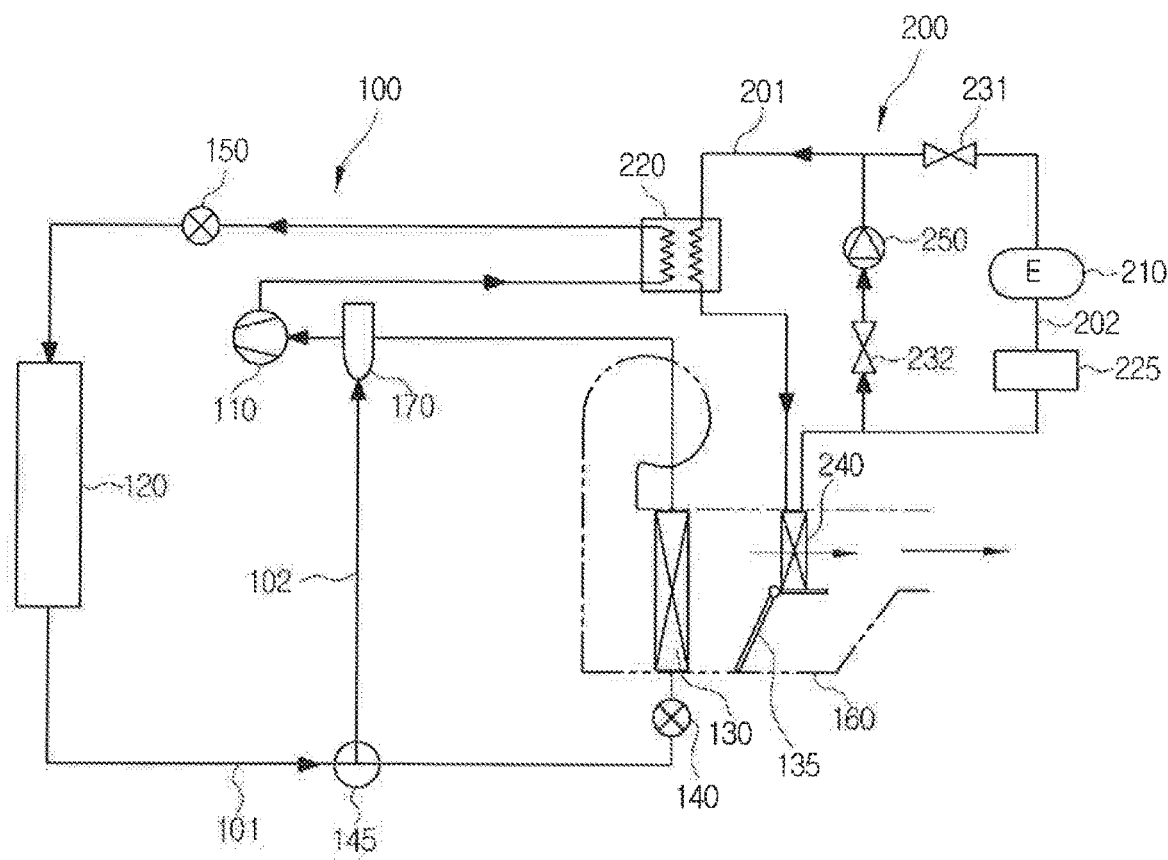
FIG. 4 is a view showing a heat pump heating mode of the air conditioner for the vehicle according to the first preferred embodiment of the present invention.

FIG. 4 is a view showing a heat pump heating mode of the air conditioner for the vehicle according to the first preferred embodiment of the present invention.

Referring to FIG. 4, in the heat pump heating mode, refrigerant circulates the compressor 110, the water cooled condenser 220, the second expansion means 150, the condenser 120, and the accumulator 170 in order. In this instance, coolant circulates the water cooled condenser 220 and the heater core 240 through the first coolant pipe 201. The refrigerant is condensed after exchanging heat with the coolant in the water cooled condenser 220, is evaporated in the condenser 120 after being throttled in the second expansion means 150, and then, returns to the compressor 110.

The temp door 135 inside the air-conditioning case 160 is operated to open the flow path directing the heater core 240. The heater core 240 receives the coolant heated after exchanging heat with the refrigerant of high-temperature and high-pressure discharged from the compressor 110 in the water cooled condenser 220, and exchanges heat between the coolant and air, so that the heated air heats the interior of the vehicle.

Figure 5:
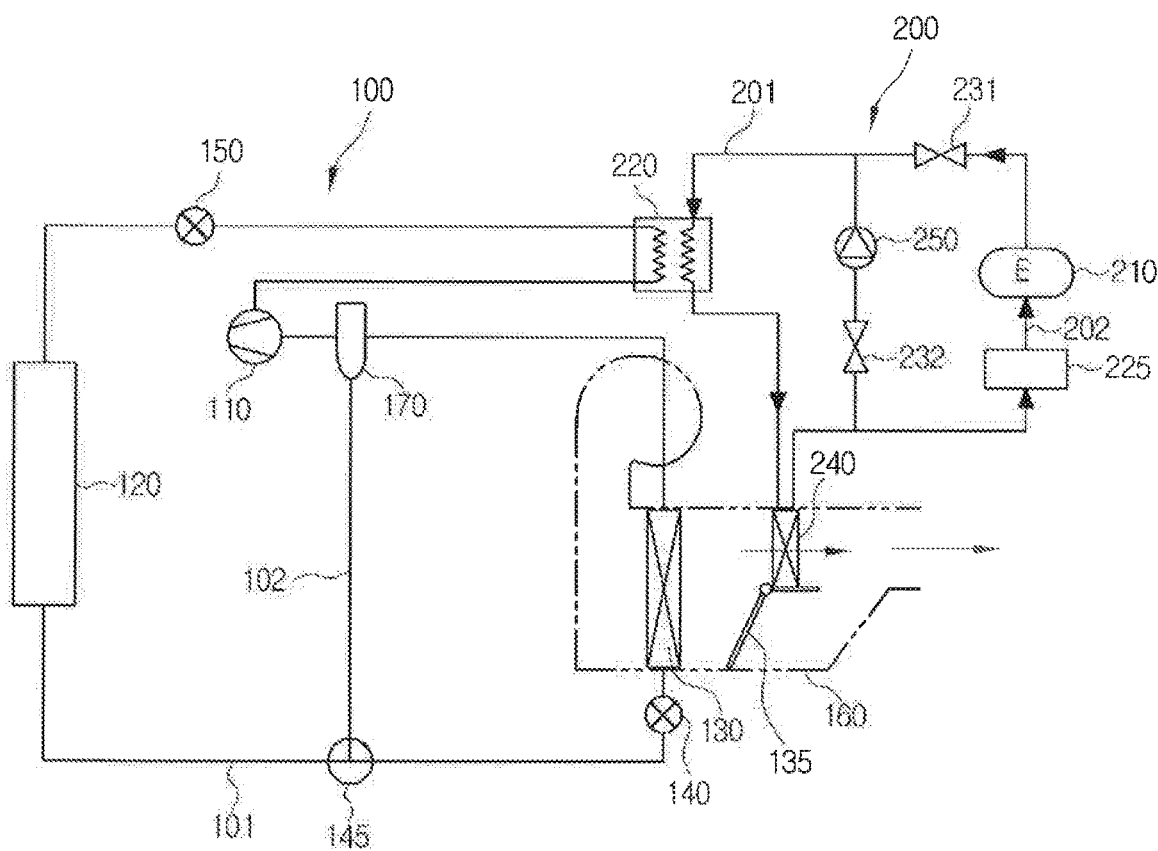
FIG. 5 is a view showing a defrosting mode of the air conditioner for the vehicle according to the first preferred embodiment of the present invention.

FIG. 5 is a view showing the defrosting mode of the air conditioner for the vehicle according to the first preferred embodiment of the present invention.

Referring to FIG. 5, in the defrost mode, operation of the refrigerant circulation system 100 is stopped. The coolant of the coolant loop 200 circulates the engine 210, the water cooled condenser 220, the heater core 240, and the reservoir tank 225 in order. The coolant is heated by waste heat of the engine 210 while exchanging heat with the engine 210, and the heat source exchanges heat with the air passing through the heater core 240 to be used as a heating source.

Figure 6:
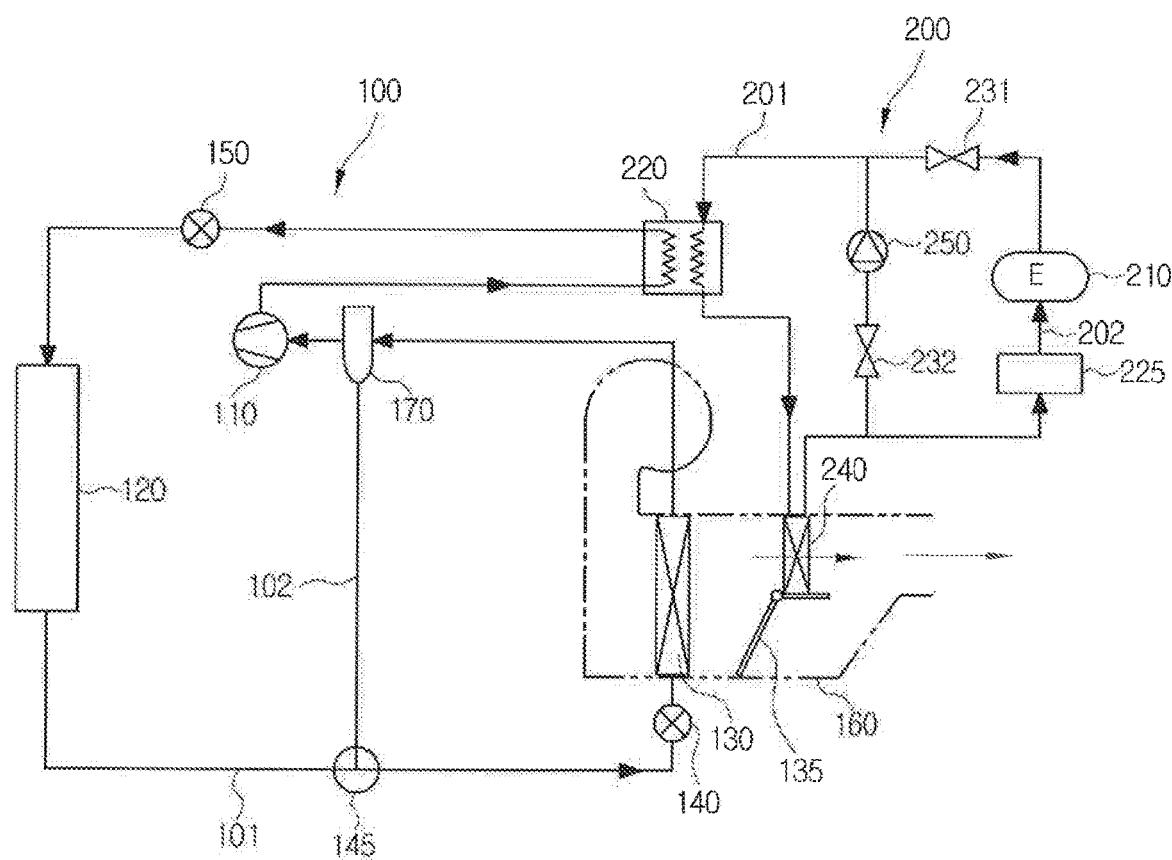
FIG. 6 is a view showing a dehumidification mode of the air conditioner for the vehicle according to the first preferred embodiment of the present invention.

FIG. 6 is a view showing the dehumidification mode of the air conditioner for the vehicle according to the first preferred embodiment of the present invention.

Referring to FIG. 6, in the dehumidification mode, the coolant of the coolant loop 200 circulates the engine 210, the water cooled condenser 220, the heater core 240, and the reservoir tank 225 in order. The coolant is heated by waste heat of the engine 210 while exchanging, heat with the engine 210, and the heat source exchanges heat with the air passing through the heater core 240 to be used as a heating source.

At the same time, the refrigerant of the refrigerant circulation system 100 circulates the compressor 110, the water cooled condenser 220, the second expansion means 150, the condenser 120, the first expansion means 140, the evaporator 130, and the accumulator 170 in order. The refrigerant is condensed in the water cooled condenser 220 after exchanging heat with the coolant, is throttled in the first expansion means 140 after directly passing the second expansion means 150 without any throttling action, is evaporated in the evaporator 130, and then, returns to the compressor 110.

The air conditioner for the vehicle according to the first preferred embodiment of the present invention includes the control unit. If the heat pump mode for carrying out heating using the heat source of the first heat exchanger is changed into an engine mode for carrying out heating using the heat source of the engine 210, the control unit maintains the heat pump mode for a predetermined period of time and controls the first valve system to carry out the engine mode so that the coolant circulates toward the engine 210 when coolant temperature of the engine reaches coolant temperature of the second heat exchanger.

In other words, while the vehicle runs in an electric vehicle mode (EV mode) for a long time, when the heat pump heating mode using the heat source of the water cooled condenser 220 is suddenly changed into the engine driving mode, the air conditioner can reduce a change in discharge temperature by maintaining the heat pump heating mode for a predetermined period of time. After that, the engine mode is carried out after the coolant temperature of the engine rises up to the coolant temperature of the heater core.

Moreover, when the mode is changed into the EV mode in the state where the coolant temperature of the engine rises above a reference value, the control unit controls to carry out heating using latent heat of the engine 210 till the coolant temperature drops below the reference value.

That is, if the mode is changed into the EV mode in a state where the coolant temperature rises excessively by operation of the engine for reasons other than air conditioning load, the control unit carries out the heat pump heating mode after carrying out heating only by the coolant through latent heat of the engine 210 till the coolant temperature drops to proper temperature. Therefore, the air conditioner for the vehicle according to the first preferred embodiment of the present invention is more effective in an aspect of fuel efficiency.

Figure 7:
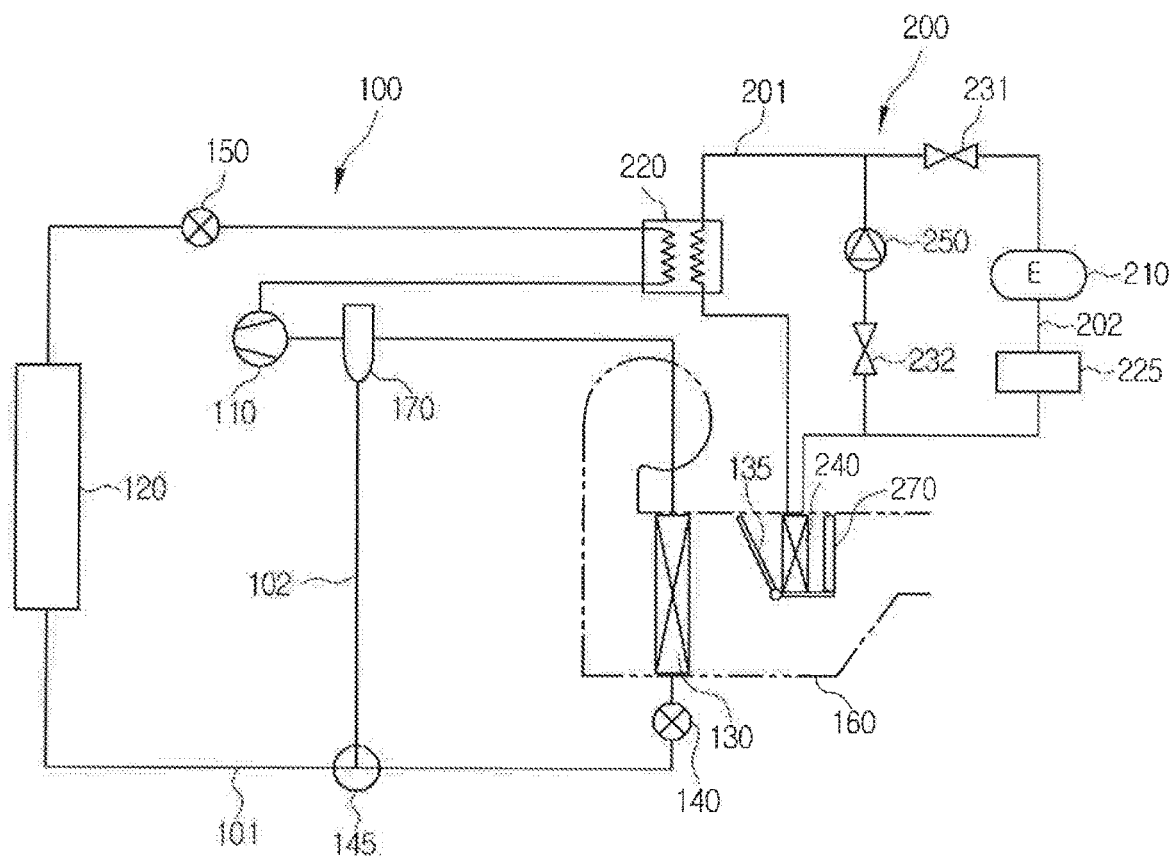
FIG. 7 is a view showing an air conditioner for a vehicle according to a second preferred embodiment of the present invention.

FIG. 7 is a view showing an air conditioner for a vehicle according to a second preferred embodiment of the present invention. Referring to FIG. 7, the air conditioner for the vehicle according to the second preferred embodiment of the present invention further includes a low voltage PTC heater 270, which is electrically heated inside the air-conditioning case 160. The air conditioner for the vehicle according to the first preferred embodiment can reduce the thickness of the longitudinal direction of the vehicle because using the waste heat of the water cooled condenser 220 and the engine 210 as a heating source without using a PTC heater. However, in the second preferred embodiment, the air conditioner includes a PTC heater which electrically generates heat at the downstream side of the heater core 240 in the air flow direction. As described above, because the air conditioner uses the waste heat of the water cooled condenser 220 and the engine 210 as a heating source, it is possible to use a relatively low voltage PTC heater 270. Therefore, the air conditioner for the vehicle according to the second preferred embodiment of the present invention also can reduce the size of the package of the air conditioner.

The air conditioner for the vehicle according to the second preferred embodiment of the present invention further includes a control unit. In the heating mode, the control unit controls the air conditioner to perform heating using the heat source of the engine 210 when coolant temperature of the engine reaches coolant temperature of the second heat exchanger after performing heating using the heat source of the first heat exchanger while warning up the engine 210.

In other words, in an initial heating, the heater core 240 is heated using the heat source of the water cooled condenser 220 of the heat pump system during warm-up of the engine 210, and air passing through the heater core 240 and the PTC heater 270 is heated. After that, when the coolant temperature of the engine rises up to the coolant temperature of the heater core, the control unit controls a flow of the coolant to pass the engine 210 so as to carry out the heating mode.

Figure 8:
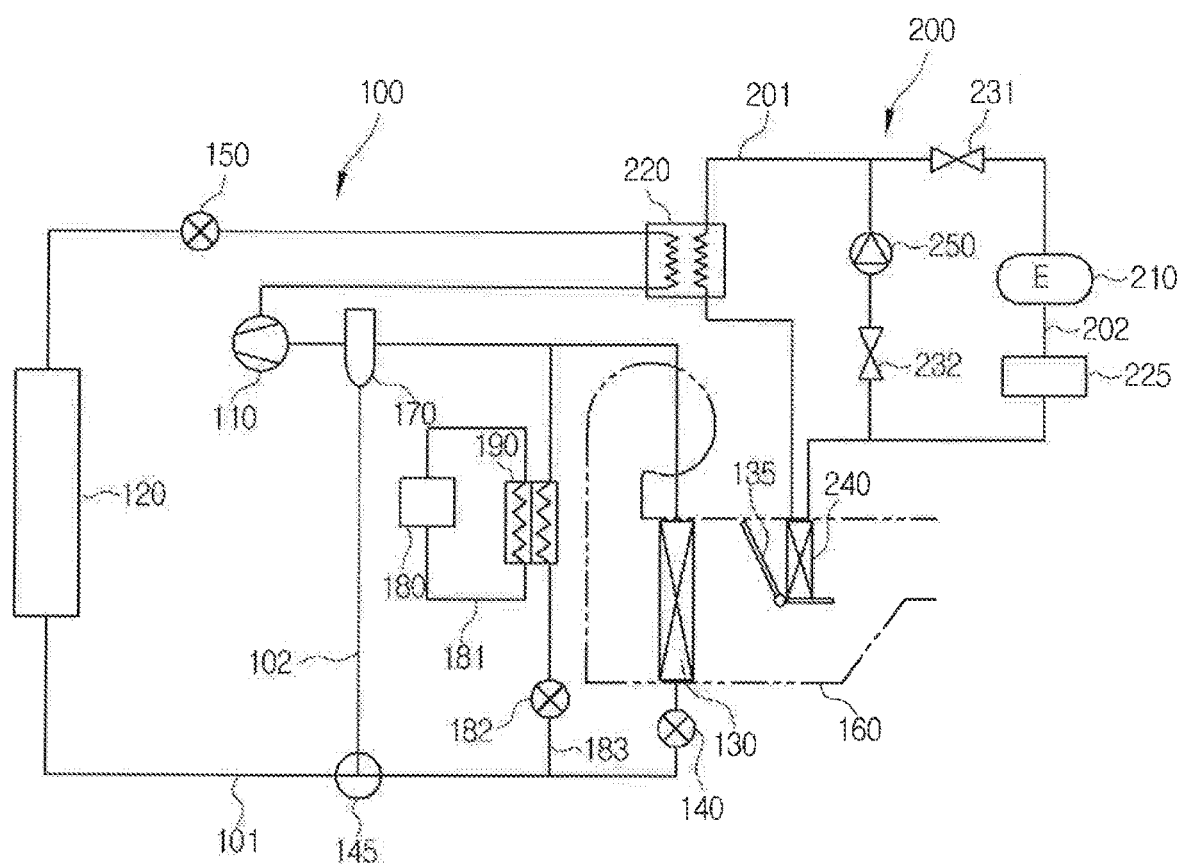
FIG. 8 is a view showing an air conditioner for a vehicle according to a third preferred embodiment of the present invention.

FIG. 8 is a view showing an air conditioner for a vehicle according to a third preferred embodiment of the present invention. Referring to FIG. 8, the air conditioner for the vehicle according to the third preferred embodiment of the present invention further includes a third refrigerant pipe 183, a third coolant pipe 181, a third expansion means 182, and a chiller 190.

The third refrigerant pipe 183 branches off from the first refrigerant pipe 101 at a downstream side of a branching point of the second refrigerant pipe 102 in the refrigerant flow direction, and is a passage bypassing the evaporator 130. The third coolant pipe 181 is a passage exchanging heat with a battery 180 of the vehicle. A circulation pump (not shown) for circulating the coolant may be mounted inside the third coolant pipe 181.

The third expansion means 182 and the chiller 190 are disposed on the third refrigerant pipe 183 in order. The chiller 190 exchanges heat between coolant of the third coolant pipe 181 and refrigerant of the third refrigerant pipe 183. In this instance, the battery 180 is a conceptual term including a battery pack or a battery system of an electrical car. As shown in the drawing, the third expansion means 182 may be formed by integration of a TXV and a solenoid valve or by a separated form of the TXV and the solenoid valve.

Some of the refrigerant passing through the condenser 120 returns to the compressor 110 through the first expansion means 140, the evaporator 130, and the accumulator 170 in order, and the rest of the refrigerant returns to the compressor 110 through the third expansion means 182, the chiller 190 and the accumulator 170 along the third refrigerant pipe 183. The coolant flowing in the third coolant pipe 181 cools the battery 180, and the heated coolant is cooled by exchanging heat with the refrigerant of low temperature passing through the chiller 190.

Furthermore, the air conditioner for the vehicle according to the third preferred embodiment of the present invention includes a control unit. When it is necessary to cool the battery 180 during the cooling mode, the control unit circulates the coolant of the third coolant pipe 181 after making makes the refrigerant flow to the third refrigerant pipe 183.

When a valve of the third expansion means 182 is opened in the state where the coolant flows, the TXV of the third expansion means 182 is opened suddenly by a high cooling load, and it causes a loud refrigerant flowing sound. Because the control unit operates the circulation pump of the third coolant pipe 181 after opening the valve of the third expansion means 182, so that the valve is first opened and a flow rate of the coolant of the circulation pump is increased gradually so as to reduce the refrigerant flowing sound.

Figure 9:
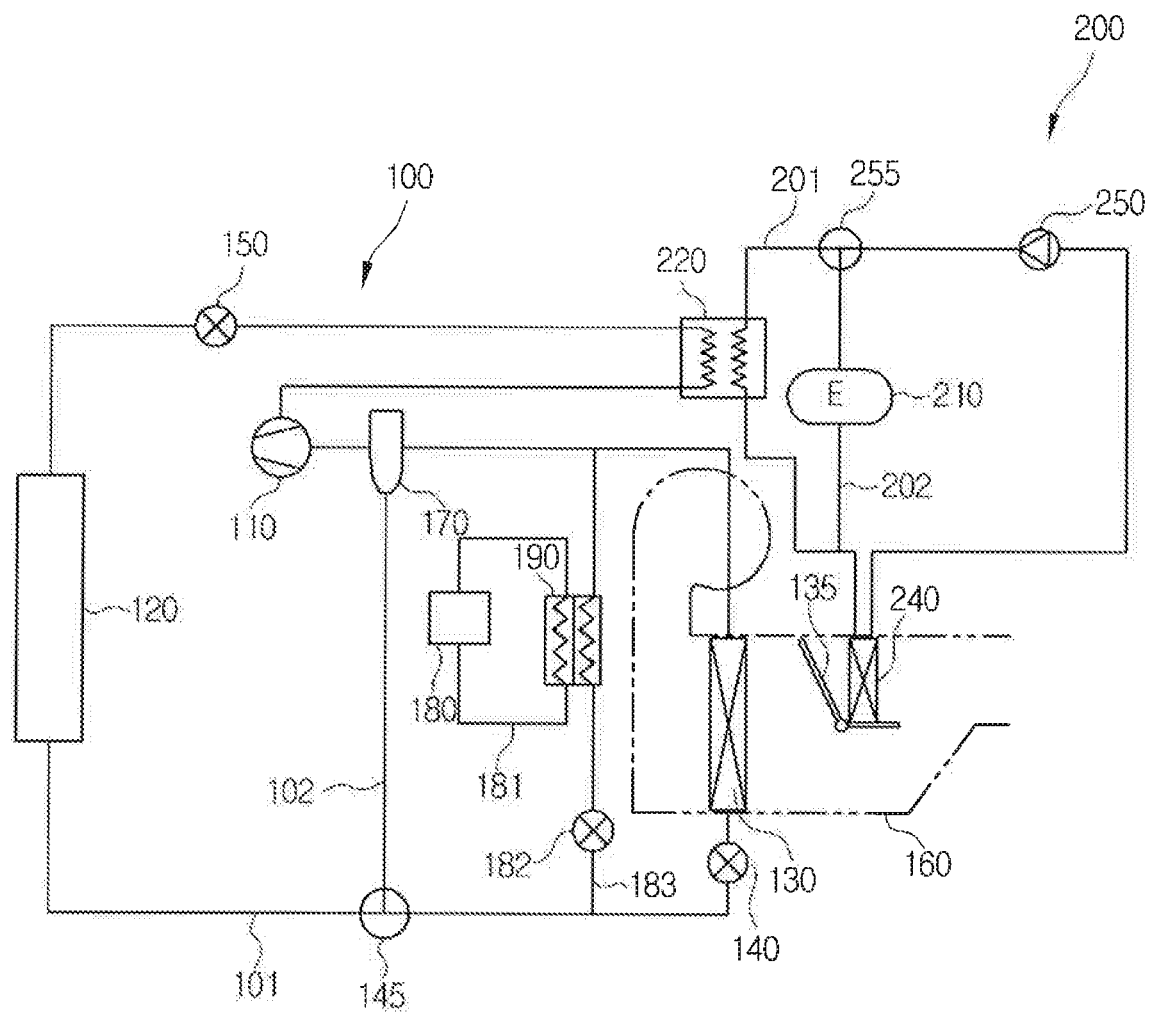
FIG. 9 is a view showing an air conditioner for a vehicle according to a fourth preferred embodiment of the present invention.

FIG. 9 is a view showing an air conditioner for a vehicle according to a fourth preferred embodiment of the present invention. Referring to FIG. 9, the air conditioner for the vehicle according to the fourth preferred embodiment of the present invention includes a first valve system different from that of the first preferred embodiment. That is, the first valve system according to the fourth preferred embodiment is configured such that coolant circulating in the second heat exchanger selectively passes the first heat exchanger and the engine 210. The first coolant pipe 201 connects the heater core 240 with the water cooled condenser 220, and the second coolant pipe 202 branches off from the first coolant pipe 201 and exchanges heat with the engine 210.

In more detail, a three-way valve 255 is disposed at the branching point between the first coolant pipe 201 and the second coolant pipe 202. The first coolant pipe 201 passes the circulation pump 250, the three0way valve 255, the water cooled condenser 220, and the heater core 240 in order in the coolant flow direction. The second coolant pipe 202 is configured such that the coolant passing through the heater core 240 bypasses the water cooled condenser 220, passes through the engine 210, and circulates the heater core 240. Through the above-mentioned configuration, the heater core 240 can selectively use the waste heat of the engine 210 or the refrigerant heat source through the water cooled condenser 220 as a heating source.

As described above, while the present invention has been particularly shown and described with reference to the example embodiments thereof, it will be understood by those of ordinary skill in the art that the above embodiments of the present invention are all exemplified and various changes, modifications and equivalents may be made therein without changing the characteristics and scope of the present invention. Therefore, it would be understood that the protective scope of the present invention shall be defined by the technical ideas of the following claims.

What is claimed is:

1. An air conditioner for a vehicle having a refrigerant circulation system, which circulates refrigerant and exchanges heat between the refrigerant and inside air of an air-conditioning case in order to cool or heat the interior of the vehicle, the air conditioner comprising:
   a first heat exchanger for exchanging heat with refrigerant of the refrigerant circulation system, the first heat exchanger raising temperature of a coolant so as to use the coolant as a heating source for an interior of the vehicle;
   a second heat exchanger, which is disposed inside the air-conditioning case to heat air passing through the second heat exchanger, and in which coolant flows;
   a first coolant pipe, which connects the first heat exchanger and the second heat exchanger with each other and is a passage through which the coolant circulates;
   a second coolant pipe, which branches off from the first coolant pipe and exchanges heat with an engine;
   a first valve system, which makes the coolant flowing in the first coolant pipe selectively flow to the second coolant pipe;
   a sensor for sensing outdoor temperature; and
   a controller which compares the sensed outdoor temperature with a reference temperature,
   wherein the controller circulates the coolant to the engine if the outdoor temperature is lower than the reference temperature, and makes the coolant bypass the engine if the outdoor temperature is higher than the reference temperature.

2. The air conditioner according to claim 1, wherein the first heat exchanger is a water cooled condenser.

3. The air conditioner according to claim 1, wherein the second heat exchanger is a heater core.

4. The air conditioner according to claim 1, wherein the first valve system circulates the coolant through the engine in a defrosting mode or a dehumidification mode.

5. The air conditioner according to claim 1, wherein the refrigerant circulation system comprises:
   a first refrigerant pipe on which a compressor, a condenser, a first expansion valve and an evaporator are mounted in order;
   a second refrigerant pipe branching off from the first refrigerant pipe and bypassing the evaporator; and
   a second valve system for controlling a flow of the refrigerant so that the refrigerant passes or bypasses the evaporator.

6. The air conditioner according to claim 5, wherein the first heat exchanger comprises a second expansion valve, which is disposed between the compressor and the condenser to selectively throttle the refrigerant between the first heat exchanger and the condenser.

7. The air conditioner according to claim 1, further comprising:
   a low voltage PTC heater electrically heated inside the air-conditioning case.

8. The air conditioner according to claim 5, wherein further comprising:
   a third refrigerant pipe branching off from the first refrigerant pipe at a downstream side of a branching point of the second refrigerant pipe in a refrigerant flow direction and bypassing the evaporator;
   a third coolant pipe exchanging heat with a battery of the vehicle; and
   a third expansion valve and a chiller disposed on the third refrigerant pipe in order,
   wherein the chiller exchanges heat between coolant of the third coolant pipe and refrigerant of the third refrigerant pipe.

9. An air conditioner for a vehicle having a refrigerant circulation system, which circulates refrigerant and exchanges heat between the refrigerant and inside air of an air-conditioning case in order to cool or heat the interior of the vehicle, the air conditioner comprising:
   a first heat exchanger for exchanging heat with refrigerant of the refrigerant circulation system, the first heat exchanger raising temperature of a coolant so as to use the coolant as a heating source for an interior of the vehicle;
   a second heat exchanger, which is disposed inside the air-conditioning case to heat air passing through the second heat exchanger, and in which coolant flows;
   a first coolant pipe, which connects the first heat exchanger and the second heat exchanger with each other and is a passage through which the coolant circulates;
   a second coolant pipe, which branches off from the first coolant pipe and exchanges heat with an engine;
   a first valve system, which makes the coolant flowing in the first coolant pipe selectively flow to the second coolant pipe; and
   a controller which controls the air conditioner to perform heating using a heat source of the engine when coolant temperature of the engine reaches coolant temperature of the second heat exchanger after performing heating using a heat source of the first heat exchanger while warming up the engine in a heating mode.

10. An air conditioner for a vehicle having a refrigerant circulation system, which circulates refrigerant and exchanges heat between the refrigerant and inside air of an air-conditioning case in order to cool or heat the interior of the vehicle, the air conditioner comprising:
    a first heat exchanger for exchanging heat with refrigerant of the refrigerant circulation system, the first heat exchanger raising temperature of a coolant so as to use the coolant as a heating source for an interior of the vehicle;
    a second heat exchanger, which is disposed inside the air-conditioning case to heat air passing through the second heat exchanger, and in which coolant flows;
    a first coolant pipe, which connects the first heat exchanger and the second heat exchanger with each other and is a passage through which the coolant circulates;
    a second coolant pipe, which branches off from the first coolant pipe and exchanges heat with an engine;
    a first valve system, which makes the coolant flowing in the first coolant pipe selectively flow to the second coolant pipe; and
    a controller which maintains a heat pump mode for a predetermined period of time and controls the first valve system to circulate the coolant toward the engine when coolant temperature of the engine reaches coolant temperature of the second heat exchanger to carry out an engine mode, if the heat pump mode for performing heating using a heat source of the first heat exchanger is changed into the engine mode for performing heating using the heat source of the engine.

11. The air conditioner according to claim 1, further comprising:
    a controller which controls the air conditioner to carry out heating using latent heat of the engine till the coolant temperature drops below a reference value, when the mode is changed into an EV mode in the state where the coolant temperature of the engine rises above the reference value.

12. The air conditioner according to claim 11, further comprising:
    a controller which circulates the coolant of the third coolant pipe after making the refrigerant flow to the third refrigerant pipe, when it is necessary to cool the battery during the cooling mode.

13. The air conditioner according to claim 1, wherein the first valve system is configured such that the coolant circulating the second heat exchanger selectively passes the first heat exchanger and the engine.

* * * * *